Jan. 9, 1951     A. G. HOWARD     2,537,761
APPARATUS FOR GASIFYING LIQUID
Filed June 3, 1946
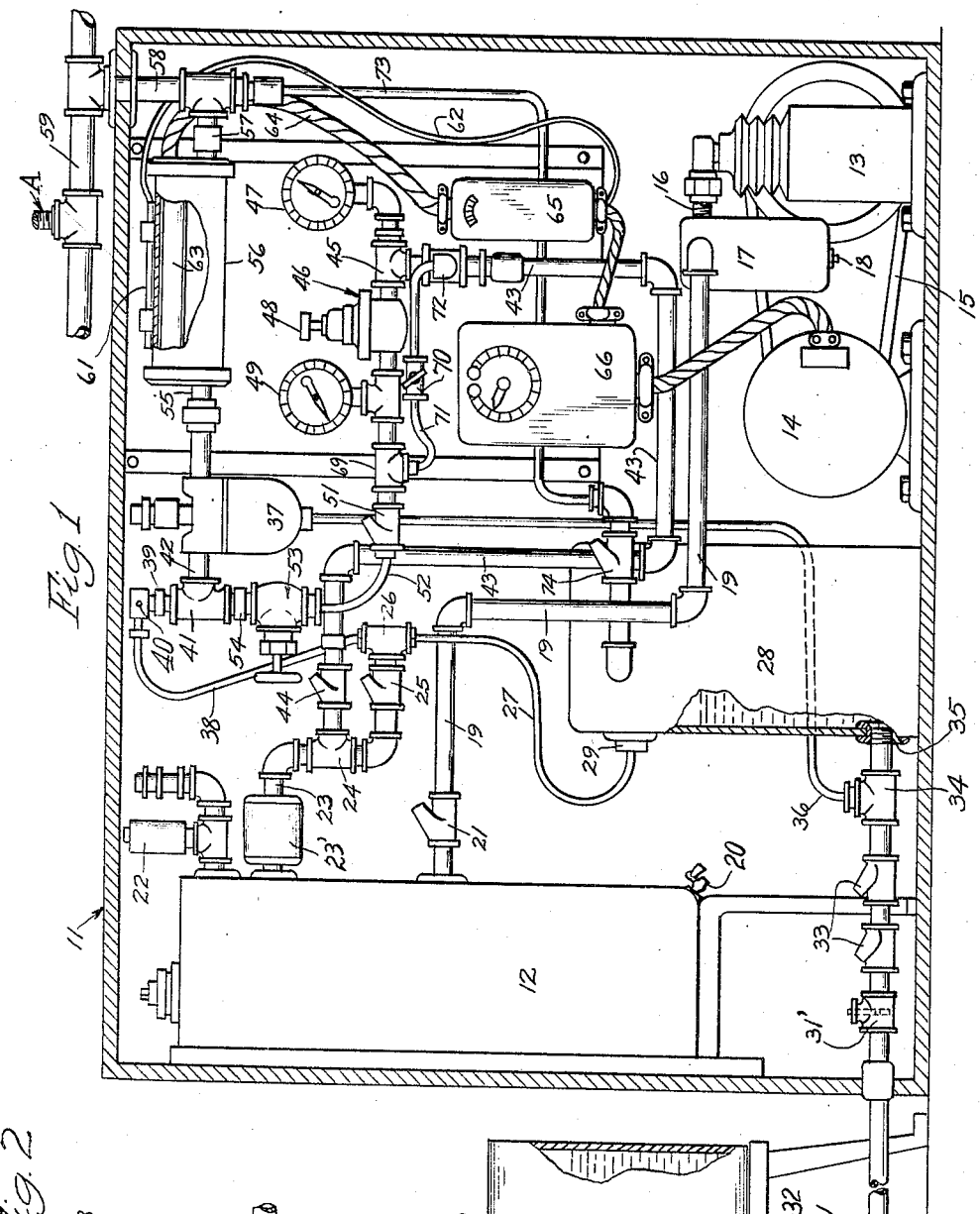
Fig.1
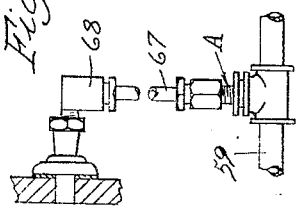
Fig.2
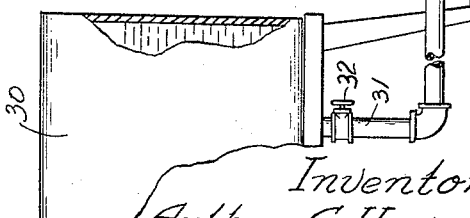
Inventor:
Arthur G. Howard
By Maurice J. Cagey
Attorney Patented Jan. 9, 1951

2,537,761

UNITED STATES PATENT OFFICE 2,537,761

APPARATUS FOR GASIFYING LIQUID

Arthur G. Howard, Flint, Mich.

Application June 3, 1946, Serial No. 674,000

12 Claims. (Cl. 21—121)

The invention relates to improvements in the method of and apparatus for gasifying a liquid, and is concerned particularly with an improved apparatus for producing and distributing an insecticidal gas for use to control insects such as are common to the milling industry and the like.

The method and apparatus involving the principles of the present invention constitute improvements over the method and apparatus shown and claimed in my copending application Serial No. 580,447, filed March 1, 1945.

In the instant apparatus means is provided to maintain a plentiful supply of liquid insecticide within the apparatus at all times for processing and ultimate distribution in gaseous form through a system with which the apparatus is associated. The apparatus is particularly useful to gasify insecticide originally in liquid form, and it is associated with a system of distribution that facilitates the discharge of the insecticidal gas under pressure directly into bins, processing machines and other containers or equipment used in the food processing industry, such as, for example, in the milling or baking industries.

Treatment of flour and flour milling or dough handling equipment with an insecticide is required at regular intervals to control insects which are particularly prevalent in such equipment. More specifically, treatment of flour and flour or dough handling equipment with known liquid insecticides by means of an atomizing sprayer is not entirely satisfactory because of the attendant objectionable features which usually result from the application of a fumigant in its liquid state. It is, therefore, an object of the present invention to provide a novel apparatus especially adapted to pre-vaporize a liquid insecticide, in a gaseous form as distinguished from mere atomization and to discharge such insecticidal gas under pressure directly into the interior of the bin, processing machine or other container or equipment so as to cause the insecticidal gas to blanket and commingle with the contents thereof.

Such treatment of the contents in storage bins or of processing equipment preferably is performed at regular intervals and for predetermined peiods of time. It is, therefore, another object of the present invention to provide a time controlled apparatus embodying novel structural features adapted to generate and distribute a predetermined quantity of insecticidal gas at selected time intervals.

Another object is to provide an insecticidal gas generating apparatus with novel means to insure delivery of a plentiful supply of liquid insecticide to the apparatus at all times.

Another object of the present invention is to provide an apparatus of the kind referred to which is highly efficient in use, not expensive to manufacture, install or maintain, and which is entirely automatic in starting, operating and shut-down.

Other and further objects of the present invention will be apparent from the following description and claims and are illustrated in the accompanying drawing which, by way of illustration, shows a preferred embodiment and the principle thereof. Other embodiments of the invention embodying the same principle may be used and structural changes may be made as desired by those skilled in the art without departing from the present invention and purview of the appended claims.

In the drawing:

Fig. 1 illustrates an embodiment of the apparatus used for carrying out the method of the present invention, showing the casing enclosing such apparatus broken away.

Fig. 2 is an elevational view showing a distributing conduit and dispensing valve in association with a wall of a bin or other piece of flour handling equipment.

The embodiment of the apparatus disclosed in the accompanying drawing and useful in carrying out the present method of gasifying an insecticidal liquid preferably is compactly arranged and is mounted within a casing or housing 11 so as to have a pleasing overall appearance. The apparatus illustrated includes an air pressure tank 12, an air compressor 13, and a motor 14 for operating the compressor. The compressor may be of any suitable type and is of sufficient capacity to create the air pressure necessary for efficient operation of the apparatus and said compressor may be operated by the motor through a connecting belt 15 in the usual manner.

A pipe 16, connected at one end to the head of the air compressor 13, is connected at its other end into a separator 17 which functions to remove moisture from air passing therethrough. Water collected in the separator may be withdrawn through a drain 18. Substantially dry air leaving the separator 17 under pressure flows through a pipe line 19 into the air pressure tank 12 and a check valve 21 is provided in said pipe line to prevent a reverse flow.

The air pressure tank 12 may be of a size suitable to be enclosed within the housing 11 and it preferably is constructed to withstand an internal working pressure of between 6 to 15 p. s. i. and is provided adjacent its upper end with a safety blow-off valve 22 set to operate at 15 p. s. i. so as to avoid the possibility of the pressure within the tank reaching dangerous proportions. The air pressure tank has sufficient capacity to permit precipitation and condensation of moisture contained in the air entering it through the pipe line 19 and a drain 20 is provided at the bottom thereof through which such condensate may be removed.

An outlet line 23 leads from the tank 12 and it includes a silica-gel dehydrator 23' that is effective to remove any moisture remaining in the air passing from said tank. The line 23 is connected with the air pressure tank adjacent its upper end and it also includes a T 24 and a check valve 25 located closely adjacent to the second T 26 provided on the end of said line for purposes to be explained hereinafter. The T 26 has connected into one of its outlets a conduit 27 of a diameter considerably smaller than the diameter of the pipe line 23. This conduit 27 is connected into the upper portion of a liquid pressure tank 28, as at 29, so that when a predetermined pressure is created within the air pressure tank 12 a like pressure is maintained within the head of the liquid pressure tank 28.

The liquid pressure tank 28 is adapted to contain the insecticidal liquid that is to be converted into an insecticidal gas and it is one of the purposes of the present invention to afford means whereby said liquid pressure tank 28 always contains a substantial volume of said liquid upon starting gasifying operation. Accordingly, a container 30, such as the barrel, tank or the like, in which the insecticidal liquid is originally contained upon delivery, may be suitably located, as shown, outside of the apparatus housing and at a level below the level of the highest point in the liquid system of the apparatus. This container 30 is then connected through an inlet pipe line 31, including a shut-off valve 32, baffle 31', check valves 33 and a T 34, with an inlet 35 at the lower portion of the liquid pressure tank 28. The baffle 31' is provided for a purpose to be described hereinafter. When the shut-off valve 32 is open and the level of the liquid in the container 30 is higher than the level of the liquid within the liquid pressure tank 28, and while the apparatus is not in operation, liquid will flow from the container 30 to the liquid pressure tank until such time as the levels of the two bodies of liquid are equal, or unless such leveling off is prevented by the building up of an air pressure head within the upper portion of the liquid pressure tank 28. Such pressure head is, of course, always maintained during compressor operation because the upper portion of the pressure tank is in direct communication at all times with the air pressure tank through the conduit 27.

As an example of the manner in which the flow of liquid from the container 30 to the pressure tank 28 is controlled, let it be assumed that the compressor is not operating and that the presure in the air pressure tank 12 has fallen below a given pressure. If the head of liquid within the container 30 is of sufficient weight to overcome the air pressure head and the weight of any liquid then in the liquid pressure tank 28, liquid will flow into the liquid pressure tank 28 until the pressures within the container 30 and liquid pressure tank 28 are equalized.

When the compressor is placed in operation to build up the air pressure in the air pressure tank 12, the resulting increased pressure head in the liquid pressure tank 28 will tend to force the liquid therein contained outwardly in a direction reverse to that in which it flowed through the pipe 31 when entering the tank 28. Such reverse movement of the liquid does not result in a return of said liquid to the container 30 because the increase in pressure within the liquid pressure tank 28 has closed the check-valves 33. As a result, the reverse flow of liquid entering the pipe 31 at the liquid pressure tank inlet 35 will flow through the conduit 36 which is connected at one end into the pipe line 31 as by means of a T 34. The other end of the conduit 36 is connected with and opens into a metering valve 37 which is preferably a restricted flow needle type valve provided with a sight glass so as to permit visual regulation of liquid flow. A type of valve I have found desirable for use is manufactured by the Brooks Rotameter Co. of Lansdale, Pennsylvania. Obviously, a fresh supply of liquid cannot be delivered to the liquid pressure tank 28 during machine operation and as a consequence there never is any possibility of delivering a quantity of insecticidal gas in excess of the liquid contents of the liquid pressure tank at the start of any period of operation.

The liquid entering the metering valve 37 in the form of a spray is adapted to be entrained in a stream of air for vaporization and to this end the metering valve is suitably connected with a plurality of air inlet lines in a manner to be described hereinafter.

One of the lines provided for delivering air to the metering valve 37 includes a conduit 38 of relatively small internal diameter, which is connected at one end to the one outlet of the end T 26 and at its other end through an orifice valve 39 with one inlet of the T 41 having direct connection, as by means of a nipple 42, with the metering valve 37. Thus, a very small quantity of air flowing to the end T 26 from the pressure tank 12 is diverted through the conduit 38 for delivery to the metering valve 37. Because air is being delivered through the pipe line 23 at all times when pressure is maintained within the air pressure tank 12, a steady flow of air under pressure is maintained within the conduit 38 for discharge into the metering valve 37. This stream of which is at about 15 p. s. i. is, however, insufficient in volume to vaporize the liquid to the degree necessary for its efficient use; consequently, a second air inlet line is provided by means of which a substantially greater volume of air but at a reduced pressure is delivered into the metering valve.

It might be noted at this time that the valve 39 has a small vent orifice therein. This is provided to avoid the creation of an air block in the liquid tank 28 which would prevent liquid from the supply tank 30 being delivered to tank 28 during the periods of non-operation of the apparatus. Also, when the apparatus is shut down, pressure in the tank 28 is relieved so that the flow of liquid therefrom is arrested.

This secondary or rather the main line for delivering air under reduced pressure to the metering valve 37 includes piping 43 which is connected into and communicates with the T 24 in the main air distributing line 23 and it includes a check-valve 44 to prevent a reverse flow of air through said pipe line. The pipe line 43 has its end connected into one side of a T 45 carried in a header pipe assembly 46, which assembly includes a high pressure gauge 47, a flow regulator valve 48, a low pressure gauge 49, a check-valve 51 and a conduit 52 of reduced diameter which connects said header assembly 46 with a shut-off valve 53 connected by a nipple 54 with one inlet of the T 41 oppositely disposed to the inlet of said T receiving the fittings 39 connecting the conduit 38 therewith. The purpose of the pipe line 43 and header assembly 46 is to insure an adequate volume of air for delivery into the metering valve 37 at a pressure considerably lower than the pressure of the air delivered to it through the conduit 38 so as to thereby create a turbulence in the air flowing through said metering valve and thereby increase the absorption of liquid spray flowing therethrough The valve 48 serves to reduce the air pressure in line 43 from 15 p. s. i. to about 8 p. s. i. so that air enters valve 37 through line 52 at about 8 p. s. i. Liquid from the tank 28, however, is delivered to the valve 37 at the full pressure of 15 p. s. i.

Vapor leaving the metering valve 37 is delivered through a conduit 55 into one end of a gasifying or vaporizing chamber 56 for discharge through piping 57 and 58 to a feeder line 59 for distribution throughout various sections of a building within which the apparatus is located and which contains the machinery or other equipment to be treated. The feeder line 59 may be provided with any number of distribution lines or branches commensurate with the capacity of the apparatus, and these branches, as well as the feeder line 59 may be tapped at selected intervals to receive conduits for conducting the insecticidal gas flowing through the feeder line 59 to individual pieces of the apparatus or equipment.

The temperature of vapor flowing into the chamber 56 is too low for complete gasification because of the refrigerating effect of vaporization. Complete gasification of such refrigerated vapor and the elimination of all condensation of moisture from the outside air surrounding the chamber; with objectionable dripping of such condensate on other parts of the apparatus is assured by providing means in association with the chamber for raising the temperature of said vapor which increases the moisture absorption quality of the air therein contained. To this end, a cartridge type heater element 63 is arranged within the chamber 56 and is suitably connected, as by an electrical conduit 64, with a source of current through a thermo-switch 65. The heating manifold is also provided with a pressure tube 61 suitably connected by a hydraulic line 64 with the thermo-switch 65, which switch is effective to make and break the electrical circuit to the heating element 63.

An automatic time-control switch 66 is connected in the electrical circuit for the motor 14 so as to afford means to start and stop the apparatus and energize the heater 63 at predetermined periods of time. This time-control switch may be of any conventional construction suitable for installation in the present apparatus. Of course, when the temperature of the manifold 56 reaches the degree required for efficient vaporization, during apparatus operation the thermostat switch 65 actuates to cut off the current supply thereto.

The means, best illustrated in Fig. 2, for conducting the insecticidal gas from the feeder line 59 into the various units, may consist of a conduit 67 having a dispensing valve 68 at its discharge end which extends through an opening in the wall of the bin or apparatus to be fumigated so that the insecticide gas flowing through the conduit 67 is delivered directly into the interior of the bin or other equipment to thoroughly blanket the entire contents thereof and comingle therewith.

Because of the possibility that the flow regulator valve 48 may on occassion stick or otherwise become inoperative in such manner as would cut off the flow of air through the header assembly, a suitable by-pass line is connected around the header assembly. Thus, the header assembly 46 may be provided at 69 with a T having a conduit 71 connected therewith and communicating through a T 72 with the pipe line 43. A valve 70 is provided in the by-pass conduit 71 and is adapted to reduce the pressure of the air in the by-pass line to about 8 p. s. i. so that one half of the air volume delivered to the metering valve 37 through conduit 52 flows through conduit 71 while the remaining portion passes through the flow regulating valve 48. Accordingly, should the flow regulating valve become stuck while closed, at least a sufficient quantity of air will continue to flow to the metering valve 37 to avoid complete operating failure. A bleed line 73 leads from the piping 57 to the upper portion of the liquid pressure tank 28 and this line is provided with a check-valve 74 so as to prevent the movement of air from the liquid pressure tank through said line and directly into the feeder line 59 while at the same time it permits any condensate in the distribution system to return to the liquid supply when the apparatus is shut down. Such return of condensate is possible because of the bleed orifice 40 in the fitting 39 and further because the flow of liquid into the liquid pressure tank 28 is restrained by the restriction baffle 31' in the supply line 31.

It should be quite evident at this time that a very efficient apparatus is provided wherein the quantity of liquid insecticide within the liquid pressure tank 28 is always maintained, at the beginning of operation, at a level necessary for efficient operation of the apparatus, and that when the apparatus is shut down for a period of time sufficient to allow the pressure head in the tank 28 to reach a predetermined low, a fresh supply of liquid will flow into the liquid pressure tank 28 from the supply container 30. The apparatus further is characterized by the unique arrangement of the various controls and lines which insure the free unobstructed flow of air and liquid to the metering valve in quantities particularly suitable to effect the desired degree of vaporization of such liquid as is entrained by the air and carried into the heating manifold wherein its temperature is raised a sufficient degree to effect complete and thorough gasification of the insecticide, as distinguished from mere vaporization or atomization, which insecticidal gas is delivered automatcally to the various bins or other equipment to be treated without requiring any attention, inasmuch as the apparatus is entirely automatic in its operation.

It should be evident that the principle of the invention may be embodied in an apparatus embodying details varying from the details disclosed in the accompanying drawing and specifically described herein; and that, the invention may embody other modifications in the construction of the apparatus shown without departing from the spirit of the present invention or the scope of the appended claims.

I claim:

1. An apparatus for gasifying liquid comprising, in combination, a liquid supply source, a sealed tank for liquid having an inlet at its lower end, a pipe connecting said source with said inlet whereby liquid may flow by gravity into said tank, a check-valve in said pipe connection to prevent reverse flow of liquid from said tank to said source, a line connected in said pipe at a point between the inlet and said check-valve, a compressor communicating with said tank for delivering air under pressure into the upper portion of said tank to stop the flow of liquid into said tank and to maintain the liquid therein under pressure during operation of said compressor and to reverse the flow of liquid through said inlet and into said line, and means connected to said line effective to convert liquid flowing therethrough to a gaseous state prior to its discharge from the apparatus.

2. An apparatus intended for intermittent operation and actuable to produce an insecticidal gas comprising, in combination, a tank, means effective to maintain a supply of liquid insecticide in said tank, means including a compressor operable to maintain the liquid in said tank under a predetermined pressure, a metering valve, means to deliver a spray of said liquid to said metering valve, said metering valve having an inlet for air delivered thereto under pressure, means for delivering air from said compressor to said inlet, a chamber through which commingled air and liquid spray is flowed for discharge as an insecticidal gas, and a heating element in said chamber.

3. An apparatus intended for intermittent operation and actuable to produce an insecticidal gas comprising, in combination, a tank, means effective to maintain a supply of liquid insecticide in said tank, means including a compressor operable to maintain the liquid in said tank under a predetermined pressure, a metering valve, means to deliver a spray of said liquid to said metering valve, said metering valve having an inlet for air delivered thereto under pressure, means for delivering air from said compressor to said inlet, a chamber through which commingled air and liquid spray is flowed for discharge as an insecticidal gas, a heating element in said chamber, and means to control operation of said heating element.

4. An apparatus intended for intermittent operation and actuable to produce an insecticidal gas comprising, in combination, a tank, means effective to maintain a supply of liquid insecticide in said tank, means to deliver air under pressure to said tank to maintain the liquid therein under a predetermined pressure, a metering valve, means to deliver a spray of said liquid to said metering valve, said metering valve having an inlet for air delivered thereto under pressure, means for delivering air to said inlet, a heater manifold through which commingled air and liquid spray is flowed for discharge as an insecticidal gas, and time control means operative to control periodic operation of said apparatus.

5. An apparatus intended for intermittent operation and actuable to produce an insecticidal gas comprising, in combination, a tank, means effective to maintain a supply of liquid insecticide in said tank, means including a compressor operable to maintain the liquid in said tank under a predetermined pressure, a metering valve, means to deliver a spray of said liquid to said metering valve, said metering valve having an inlet for air delivered thereto under pressure, means for delivering air from said compressor to said inlet, a heater chamber through which commingled air and liquid is flowed for discharge as an insecticidal gas, time control means operative to control periodic operation of said apparatus, and a flow-regulator valve to maintain a uniform air pressure.

6. An apparatus for gasifying liquid, in combination, a sealed tank for a liquid, a source of liquid supply connected to said tank in such manner that liquid flows by gravity into said tank, means for delivering air under pressure into the container to maintain the liquid therein under a pressure greater than the pressure flowing liquid into the tank to thereby stop such flow, a metering valve to which liquid is delivered under pressure from said tank, an air line connecting with the metering valve through which air is delivered under pressure to the valve to commingle with the liquid delivered thereto, a flow regulator in said last named air line, and a heater chamber into which said commingled air and liquid is delivered for discharge therefrom in the form of a gas.

7. An apparatus intended for intermittent operation and actuable to produce an insecticidal gas comprising, in combination, a tank adapted to contain insecticidal liquid, means to deliver air under pressure to said tank, a metering valve to which said liquid is delivered, means including a flow regulator valve to conduct a supply of air under pressure to said metering valve, a conduit bypassing said flow regulator valve to deliver air under pressure to said metering valve, and a chamber through which passes commingled air and liquid leaving the meter valve.

8. An apparatus intended for intermittent operation and actuable to produce an insecticidal gas comprising, in combination, a tank adapted to contain insecticidal liquid, means to deliver air under pressure to said tank, a metering valve to which said liquid is delivered, means including a flow regulator valve to conduct a supply of air under pressure to said metering valve, a conduit bypassing said flow regulator valve to deliver air under pressure to said metering valve, a chamber through which passes commingled air and liquid leaving the metering valve and a heating element in said chamber.

9. An apparatus intended for intermittent operation and actuable to produce an insecticidal gas comprising, in combination, a tank adapted to contain an insecticidal liquid, means to deliver air under pressure to said tank during operation of said apparatus so as to discharge the liquid therefrom, a source of liquid supply including a pipe line connected to said tank and adapted to permit liquid to flow into said tank until a predetermined level is reached therein when the apparatus is shut down following a period of operation, means in said pipe line to prevent the flow of liquid into said tank during operation of the apparatus, and means connected to said line effective to convert liquid flowing therethrough to a gaseous state prior to its discharge from the apparatus.

10. An apparatus intended for intermittent operation and actuable to produce an insecticidal gas comprising, in combination, a tank adapted to contain an insecticidal liquid, means to deliver air under pressure to said tank during operation of said apparatus so as to discharge the liquid therefrom, means in said apparatus to gasify said liquid during operation of said apparatus, a source of liquid supply including a pipe line connected to said tank and adapted to permit liquid to flow into said tank until a predetermined level is reached therein when the apparatus is shut down following a period of operation, means in said pipe line to prevent the flow of liquid into said tank during operation of the apparatus, a bleeder line to return condensate from the gasifying means to said tank when the apparatus is shut down, and a restrictor in the liquid supply line to retard the flow of liquid into said tank so that said condensate may return thereto.

11. An apparatus for gasifying a liquid comprising, in combination, a liquid supply source, a sealed tank for liquid having an inlet, a pipe line connecting said source with said inlet whereby liquid may flow by gravity into said tank, a check-valve in said line to prevent reverse flow of liquid from said tank to said source, means effective to convert said liquid to a gaseous state including a conduit connected into the supply line between the tank and the check-valve, an air pressure tank, means to deliver air under pressure to said air pressure tank, a conduit connecting said air pressure tank with the liquid tank to force liquid therefrom and with the gasifying means, and a dehydrator in said conduit.

12. An apparatus for gasifying a liquid comprising, in combination, a liquid supply source, a sealed tank for liquid having an inlet, a pipe line connecting said source with said inlet whereby liquid may flow by gravity into said tank, a restrictor in said pipe line to regulate the flow of liquid into said tank, a check-valve in said line to prevent reverse flow of liquid from said tank to said source, effective to convert said liquid to a gaseous state including a conduit connected into the supply line between the tank and the check-valve, an air pressure tank, means to deliver air under pressure to said air pressure tank, a conduit connecting said air pressure tank with the liquid tank to force liquid therefrom and with the gasifying means, a dehydrator in said conduit, and means to return condensate from the gasifying means to the liquid tank when the apparatus is shut down, said restrictor preventing the excessive flow of liquid to the tank during condensate return.

ARTHUR G. HOWARD.

REFERENCES CITED

The following references are of record in the file of this patent:

UNITED STATES PATENTS

| Number | Name | Date |
| --- | --- | --- |
| 1,771,993 | Brouse | Aug. 5, 1930 |

Certificate of Correction

January 9, 1951

Patent No. 2,537,761

ARTHUR G. HOWARD

It is hereby certified that error appears in the printed specification of the above numbered patent requiring correction as follows:

Column 4, line 47, after the word "of" insert *air*; column 6, lines 57 and 58, for "delvered" read *delivered*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*